United States Patent [19]
Balolia

[11] Patent Number: 6,095,533
[45] Date of Patent: Aug. 1, 2000

[54] ADJUSTABLE MOBILE MACHINE BASE SYSTEMS AND METHODS

[75] Inventor: Shiraz Balolia, Bellingham, Wash.

[73] Assignee: Woodstock International, Inc., Bellingham, Wash.

[21] Appl. No.: 09/137,649

[22] Filed: Aug. 20, 1998

Related U.S. Application Data

[60] Provisional application No. 60/082,531, Apr. 20, 1998.

[51] Int. Cl.$^7$ .................................. B62B 3/02; B60T 1/14
[52] U.S. Cl. ............................. 280/35; 280/79.11; 188/5; 188/19
[58] Field of Search .................................. 280/79.11, 35, 280/638; 188/5, 19, 6, 7, 10, 20, 23, 4

[56] References Cited

U.S. PATENT DOCUMENTS

| | | | |
|---|---|---|---|
| 2,961,250 | 11/1960 | Beach | 280/35 |
| 3,331,613 | 7/1967 | Popelka | 280/35 |
| 4,655,466 | 4/1987 | Hanaoka | 280/35 X |
| 4,863,179 | 9/1989 | Isaacs | 280/47.34 X |
| 5,035,445 | 7/1991 | Poulin | 280/79.1 X |
| 5,193,828 | 3/1993 | Benvenuti | 280/79.11 X |
| 5,299,817 | 4/1994 | Chang | 280/35 |
| 5,599,031 | 2/1997 | Hodges | 280/35 X |
| 5,727,800 | 3/1998 | Liu | 280/87.051 |
| 5,785,293 | 7/1998 | Ford et al. | 280/35 X |
| 5,826,893 | 10/1998 | Snoeyenbos | 280/35 X |

OTHER PUBLICATIONS

Grizzly Industrial, Inc, 1998 Woodworking Tools & Accessories catalog, p. 60.
Delta Accessories catalog p. 10.
HTC Products, Inc., Catalog No. 643.

Primary Examiner—J. J. Swann
Assistant Examiner—F. Zeender
Attorney, Agent, or Firm—Michael R. Schacht; Hughes & Schacht, P.S.

[57] ABSTRACT

An adjustable mobile base that accommodates machines of different effective footprints and allows them to be selectively moved from place-to-place or fixed at a given location. The mobile base assembly comprises a frame assembly comprised of corner members and side members. The side members are telescopically received within the corner members such that a width dimension and depth dimension of the base assembly can be changed to accommodate machines having different effective footprints. A lock system may be provided which employs one or more lock assemblies. Each lock assembly comprises a lock member that is slidably received within a lock housing and a drive member which is threadably received within the lock housing. Rotating the drive member in one direction elevates one or more wheels of the base assembly and thus frictionally engages the floor surface and prevents movement of the machine on the base assembly. Turning the drive member in the opposite direction allows the stop member to be retracted up into the housing assembly. In this unlocked position, the weight of the machine is borne by wheels that allow the machine to be rolled from one location to another.

6 Claims, 4 Drawing Sheets

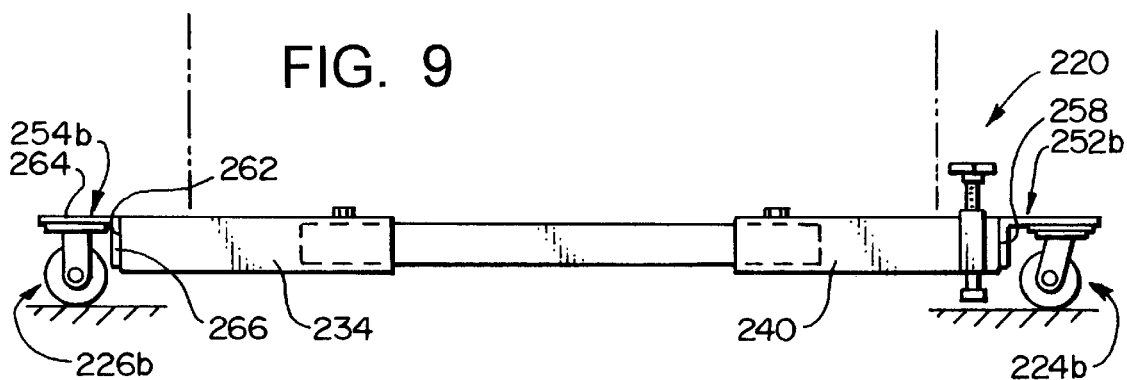
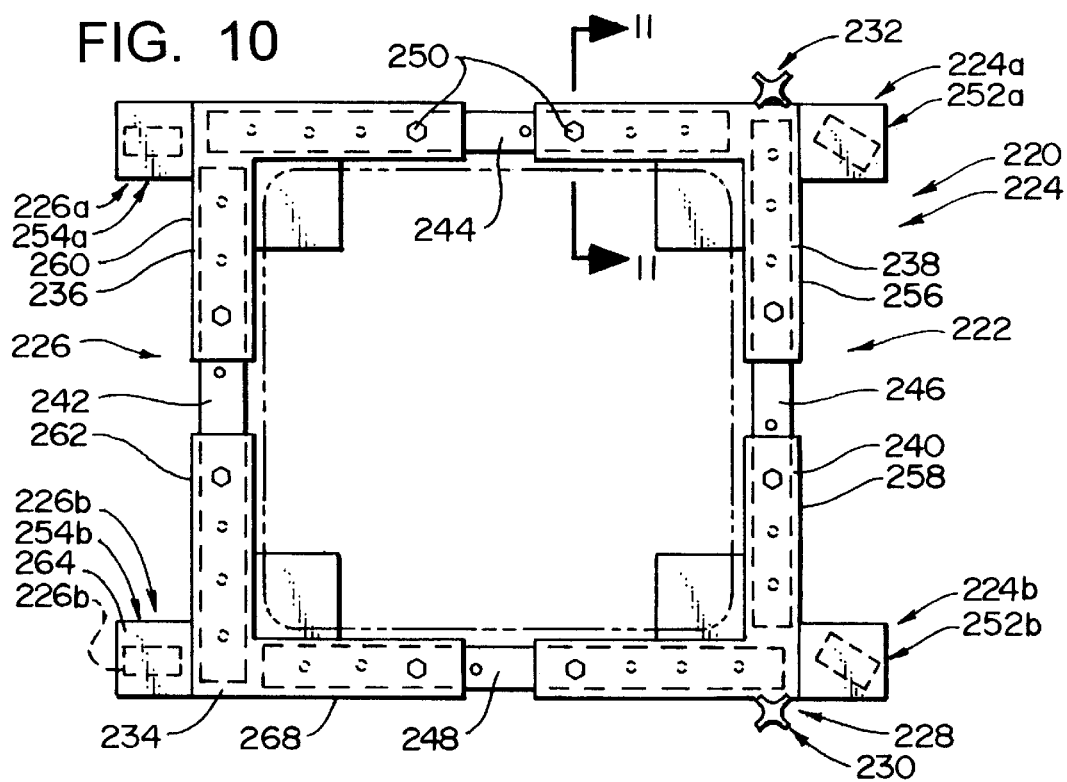

ADJUSTABLE MOBILE MACHINE BASE SYSTEMS AND METHODS

RELATED APPLICATIONS

This application claims priority of U.S. Provisional Patent Application Ser. No. 60/082,531, which was filed on Apr. 20, 1998.

FIELD OF THE INVENTION

The present invention relates to mobile machine bases and, more specifically, to mobile machine bases that are adjustable to accommodate different machinery configurations.

BACKGROUND OF THE INVENTION

Machinery such as table saws, band saws, jointers, shapers, planers, sanders, and the like should be stationary during use. In many cases, this type of machinery is permanently installed at a predetermined location in a shop. Such machinery is thus commonly sold with a stationary base having feet that frictionally engage the floor to maintain the machinery at the predetermined location.

But in many situations it is desirable to move this type of machinery between uses. For example, a user may have limited shop space, and may want to store the machinery at a relatively inaccessible location when not in use and then, immediately prior to use, move the machinery to a more accessible location. Or the user may wish to use the machinery at a job site. In this case, movement of the machinery from one location to another at the job site may be desirable.

Accordingly, mobile machine bases are often sold as an accessory to replace the stationary bases originally sold with shop machinery. Mobile bases further comprise a locking system that allows the machinery to be rolled from one location to another between uses yet immobilizes the machinery during use.

More specifically, conventional mobile machine bases comprise a relatively rigid frame assembly to which a plurality of wheel assemblies are attached. The stationary base is removed from the bottom of the machine, and the bottom of the machine is then bolted or otherwise rigidly attached to the frame assembly. Usually, the locking system employs a lock member that moves between a locked position and an unlocked position. When in the locked position, the lock member immobilizes the machinery by frictionally engaging either the wheels or the floor surface to substantially prevent relative movement between the frame assembly and the floor surface. When in the unlocked position, the lock member does not inhibit movement of the frame assembly relative to the floor surface.

Machinery of the type rendered movable by the mobile machine base of the present invention exists in a variety of shapes, sizes, and weights. Currently, manufacturers sell the mobile machine bases in a variety of configurations; the user selects one of these base configurations as appropriate for a given machine configuration.

What will be referred to herein as the "effective footprint" of the machine determines which base configuration should be selected. The effective footprint is normally defined as the outside width and depth dimensions of the bottom of the machinery. The configuration of the mobile base is defined by similar width and depth dimensions that should be just slightly larger than the width and depth dimensions of the effective footprint.

Requiring a base configuration for each effective footprint mandates a production and distribution system in which the manufacturer must design, build, and keep in inventory a plurality of base configurations. The retailers must similarly keep in stock at least the most popular, and preferably all, of these configurations. And the retailer's representative must have some expertise to advise the customer on the right base configuration for a required effective footprint. The result is an inefficient system that is labor and capital intensive. Even then, it would be difficult to provide machine bases for all machines on the market. The need thus exists for a single machine base configuration that can accommodate a number of effective footprints.

Another drawback of conventional machine bases is the locking system used. Some of these locking systems employ a lock member that, in the locked position, bears directly on the wheel to prevent rotation of the wheel. This causes excessive wear on the wheel. Other locking systems require tools to operate the locking system. The need thus exists for a machine base having improved locking systems that do not cause excessive wheel wear or require tools to operate.

Conventional machine bases further employ rigid frame assemblies that cause the machine base to occupy a relatively large volume during transportation and storage. The need thus exists for a machine base that occupies a smaller volume when not in use.

PRIOR ART

The Applicant is aware of a number of machine bases that are currently on the market.

The assignee of the present invention currently manufactures and sells a line of machine bases specially designed to fit the assignee's machinery but will also accommodate many machines manufactured by others. Each of the assignee's machine bases is specially constructed for a given effective footprint and thus a number of individual designs are required. The locking system bears directly on the wheel and thus can cause excessive wear over time.

HTC Products, Inc. and Delta each manufacture and sell a line of machine bases. The bases sold by each of these manufacturers are each designed for a specific effective footprint and thus suffer the problems described above associated with designing, building, keeping in inventory, distributing, and retailing a large number of separate base designs.

OBJECTS OF THE INVENTION

From the foregoing, it should be clear that one object of the present invention is to provide an improved mobile base system for use on machinery such as table saws, band saws, jointers, shapers, planers, sanders, and the like.

Another more specific object of the present invention is to provide a mobile base system having one or more of the following characteristics:

implemented by a single design that is adjustable to accommodate a variety of effective footprints;

employs a locking system that does not cause excessive wear on the wheels or require special tools;

may be disassembled for transportation and storage;

allows the path of the machine to be steered when moving from one location to another;

is sturdy enough to accommodate the weight of the machines to which it is attached; and can be manufactured and assembled simply and quickly.

SUMMARY OF THE INVENTION

These and other objects are obtained by the present invention, which is a mobile machine base that is adjustable to fit different machine effective footprints, which may be broken down into separate pieces for convenient shipping and storage, and which contains a simple, reliable locking system for securing the machinery carried by the base at a desired location.

One exemplary embodiment of the present invention comprises a frame assembly that comprises four corner pieces and four side pieces. Each end of the side pieces engages a corner piece so that the frame assembly takes on a rectangular over-all configuration. This rectangular configuration is defined by a width dimension and a depth dimension. The side members are telescopically received by or receive the corner members such that the width and depth dimension can be adjusted. The mobile base further comprises wheel assemblies attached to the corner members and a locking system that allows the location of the frame assembly relative to the floor surface to be fixed.

In particular, in the preferred embodiment the corner members are comprised of two short lengths of square tubing that are welded together at a 90° angle and a square plate that is welded at the inside corner of the tube members. Two holes are formed in each corner member to allow a pin to be inserted therethrough. The side members are simply a length of square tubing having a plurality of holes formed on each end. The side tubing that forms the side members is slightly smaller in cross-sectional area than the inner dimension of the square tubing that forms the corner members.

In use, the dimensions of the effective footprint of the machinery is first determined. For most machinery, this effective footprint will be square, so it can be defined by height and depth dimensions. The side members are then inserted into the corner members to obtain a rectangular assembly with the square plates on the bottom and facing inward. This assembly is then adjusted until the dimensions from inside of the corner pieces to the opposite, adjacent corner pieces are approximately equal to but slightly larger than the width and depth dimensions of the machinery. At this point, the closest holes in the side and corner members are aligned such that the bottom of the machinery is received within the corner and side members and rests on top of the triangular plates. The pins are inserted through the holes in the corner members and the side members to prevent relative movement between these members. A rigid frame assembly is thus created that is of appropriate size to support a given piece of machinery.

Of the wheel assemblies, two of them are attached to corner members such that the wheels rotate about a horizontal fixed axis that extends through the wheels. The other two wheels are attached to corner pieces such that they rotate about individual horizontal axes and vertical axes. These wheels allow the machinery to be steered as it is transported.

The exemplary locking system of the preferred embodiment comprises first and second stop members that may be fixed relative to two of the corner members such that they frictionally engage the floor surface and prevent movement of the machinery. In particular, the stop system comprises two stop assemblies, each of which comprises a cylinder attached to the corner member, a stop member telescopically received within the cylinder, and a drive member threadably received within the cylinder member. By rotating the drive member, the stop member may be displaced downwardly to lift the wheel adjacent thereto off the floor. These locking assemblies are located next to the wheels that rotate about vertical axes, and when these wheels are elevated the system is rigidly fixed at the desired location.

Other aspects of the present invention will be apparent from the following detailed description.

BRIEF DESCRIPTION OF THE DRAWINGS

FIG. 9 is a side elevational view depicting the mobile machine base of a second embodiment of the present invention;

FIG. 10 is a top plan view of the mobile machine base shown in FIG. 9; and

FIG. 11 is a section view taken along lines 11—11 in FIG. 10.

DETAILED DESCRIPTION

Figure 1:
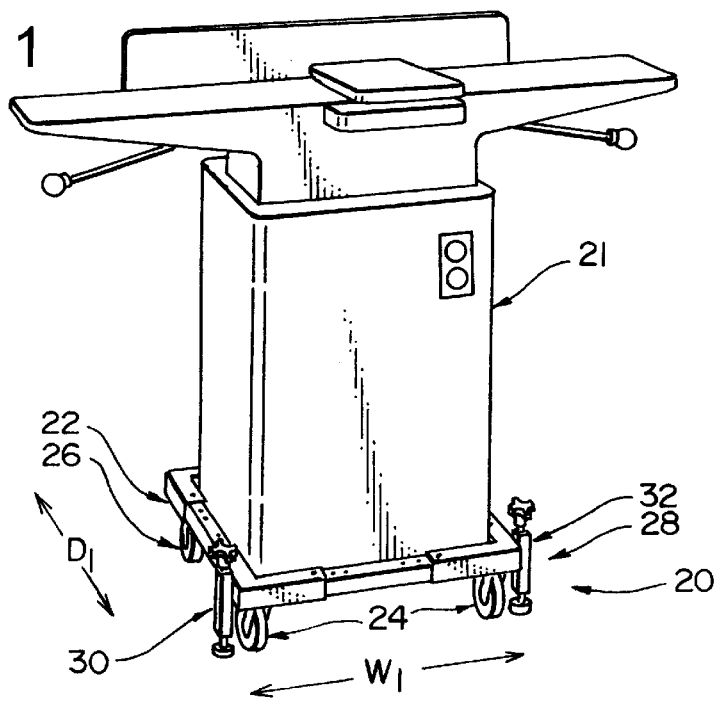
FIG. 1 is a perspective view of a mobile machine base of the present invention being used to support a planer at a desired location on a floor surface.

Referring now to FIG. 1, depicted at 20 therein is a mobile machine base constructed in accordance with, and embodying the principles of the present invention. The mobile machine base 20 is shown supporting a machine 21, which in this case is a planer. The machine 21 is relevant to the present invention only in that it defines an effective footprint having a width dimension $W_1$ and depth dimension $D_1$.

FIG. 1 shows that the mobile machine base 20 comprises a frame assembly 22, front and rear wheel assemblies 24 and 26, and a locking system 28 comprising first and second locking assemblies 30 and 32.

Figure 2:
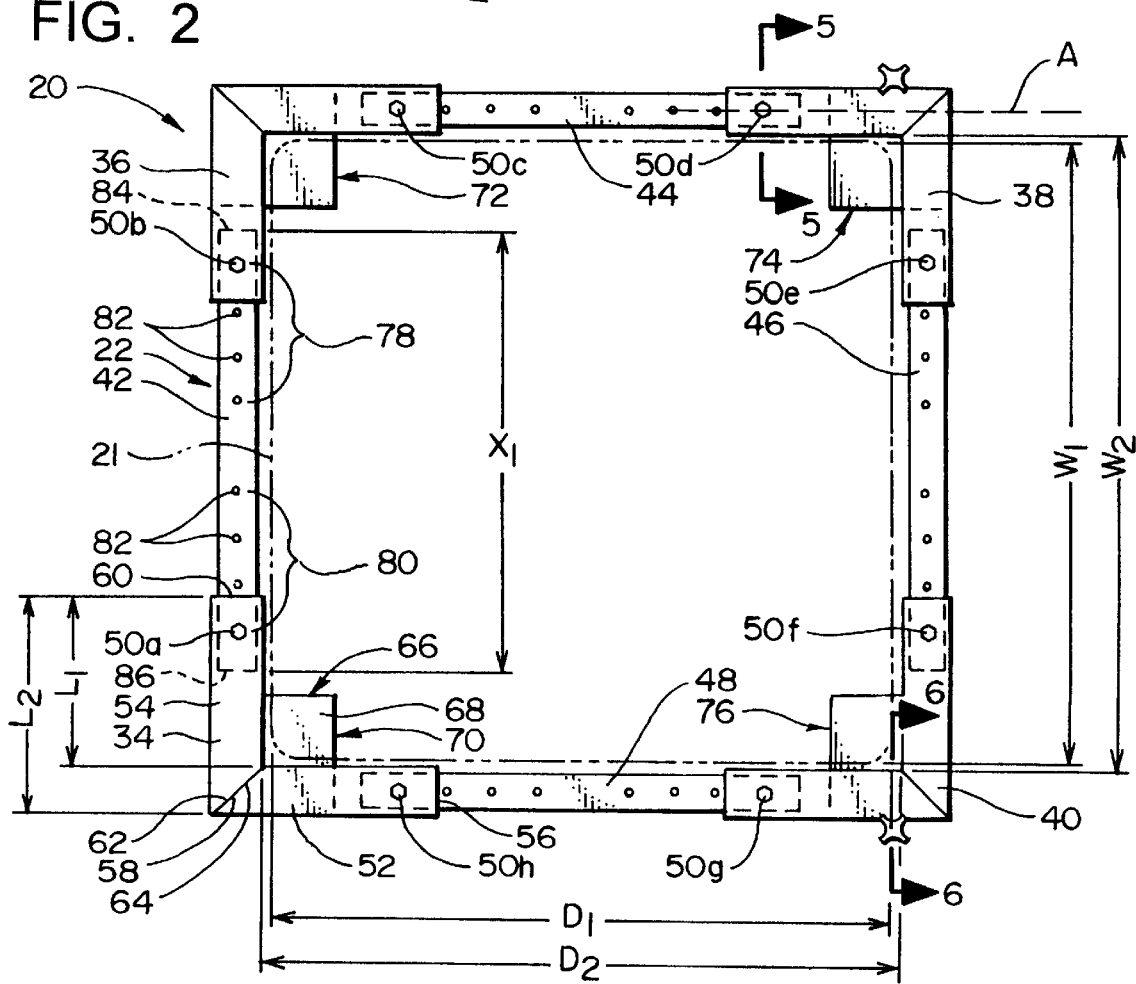
FIG. 2 is a top plan view of the mobile machine base shown in FIG. 1.

Referring now to FIG. 2, it can be seen that the frame assembly 22 comprises first, second, third, and fourth corner members 34, 36, 38, and 40 and first, second, third, and fourth side members 42, 44, 46, and 48. The frame assembly further comprises a plurality of screw members 50 that join the corner members 34–40 to the side members 42–48.

The corner members 34–40 are identical to each other; similarly, the side members 42–48 are identical to each other. Accordingly, only the first corner member 34 and first side member 42 will be described herein in detail.

The corner member 34 comprises first and second tube members 52 and 54. The tube member 52 has a distal end 56 and a proximal end 58; the second tube member 54 similarly defines a distal end 60 and a proximal end 62. The distal end 56 and 60 are cut at a 90° angle relative to the center axis of the tube members 52 and 54. The proximal ends 58 and 62 are cut at a 45° angle relative to the longitudinal axes of the members 52 and 54. The proximal ends 58 and 62 are welded along a seam 64 such that the tube members 52 and 54 extend from each other at a substantially right angle.

The corner member 34 further comprises a rectangular plate member 66 that is welded to one side of the tube members 52 and 54 to define a support surface 68 at the inside angle formed by the tube members 52 and 54. The rectangular plate 66 thus braces and strengthens the corner formed by the tube members 52 and 54 and provides the surface 68 for supporting the machine 21. In particular, as shown in FIG. 2, the machine 21 comprises first, second, third, and fourth corner portions 70, 72, 74, and 76 that overlap the support surfaces 68 defined by the rectangular plates 66.

The tube members 52 and 54 each have an inner length $L_1$ and an outer length $L_2$. The significance of these lengths $L_1$ and $L_2$ will become apparent from the following discussion.

Referring now to the side member 42 of the frame assembly 22, this is simply a rectangular bar having a length $X_1$ and first and second groups 78 and 80 of holes 82 formed therein. The first group of holes 78 is adjacent to a first end 84 of the member 42, while a second group 80 is adjacent to a second end 86 thereof.

Figure 5:
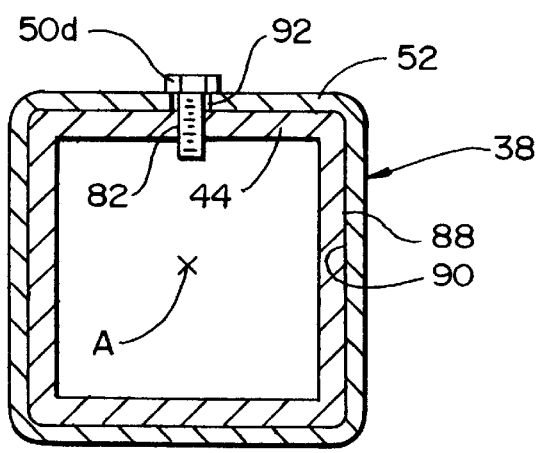
FIG. 5 is a section view taken along lines 5—5 in FIG. 2.

Referring now for a moment to FIG. 5, depicted therein is the tube member 52 of the corner member 38, the side member 44, and the screw 50d. FIG. 5 shows that an outer circumferential path 88 of the side member 44 is approximately the same (in practice slightly smaller) than an inner perimeter path 90 of the cross-sectional area of the tube member 52. With the screw 50d removed, the tube member 52 and side member 44 may move relative to each other along a common axis A. FIG. 5 also shows that the screw 50d extends through an attachment hole 92 formed in the tube member 54 and one of the holes 82 formed in the side member 44.

Figure 4:
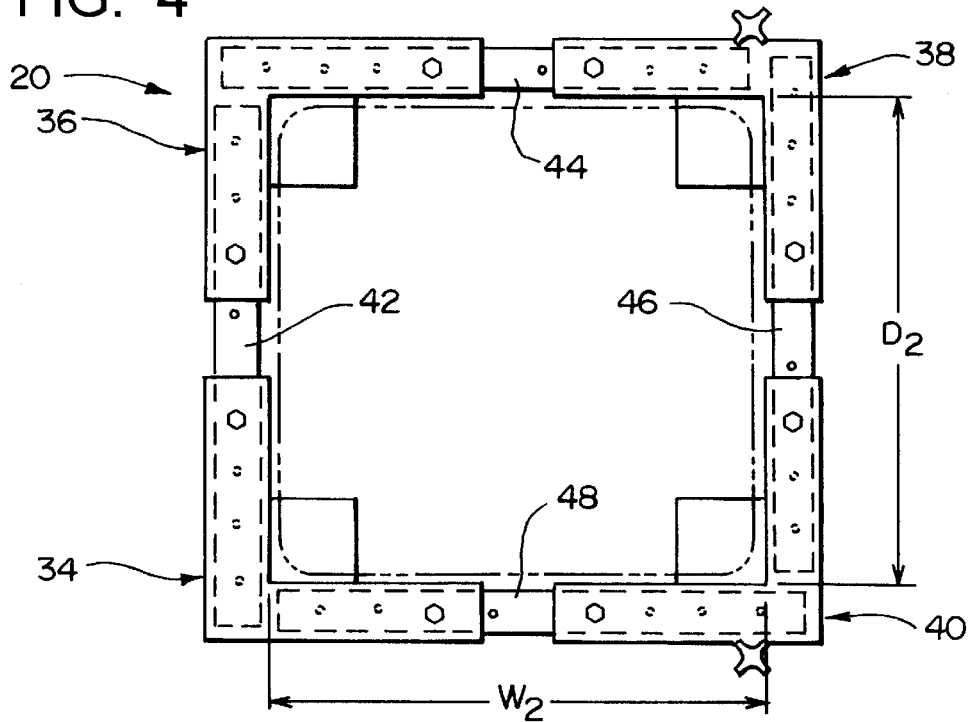
FIG. 4 is a top plan view showing the mobile machine base of FIG. 1 in a different configuration from that shown in FIG. 1.

Comparing FIGS. 2 and 4, it can be seen that in FIG. 2 the mobile base 20 is in its largest configuration and in FIG. 4 is in its smallest configuration. In particular, the base assembly 20 defines a width dimension $W_2$ and a depth dimension $D_2$. In FIG. 2, these dimensions are much longer than in FIG. 4.

Figure 3:
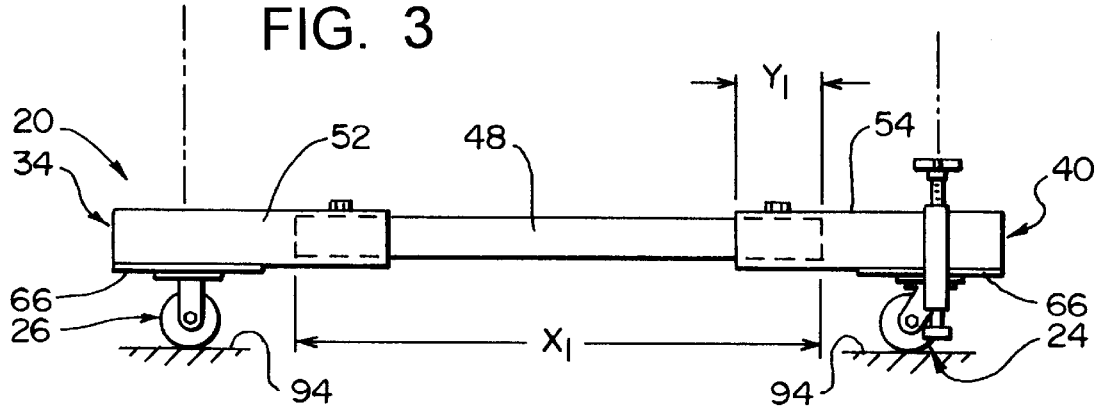
FIG. 3 is a side elevational view depicting the mobile machine base of FIG. 1.

The largest dimensions of the assembly 20 are defined by the length $X_1$ of the side members 42–48 and the inner length $L_1$ of the corner members 52 and 54. In this largest configuration, enough overlap is present between the side members 42 and the tube members 52 and 54 such that the weight of the machine 21 does not cause deflection of the tube members 52 and 54 relative to the side member 54. In the exemplary embodiment 20, this overlap is a distance $Y_1$ as shown in FIG. 3. In this respect, it should be noted that the primary weight of the machine 21 is borne through the plate 66 and directly down to the wheels 24 and 26 and onto a floor surface 94 in which these wheels 24 and 26 are in contact.

The smallest configuration (FIG. 4) in which the assembly 20 may be placed is defined by the lengths of the side members 42–48 and the outer lengths $L_2$ of the bar members 52 and 54. As shown in FIG. 4, almost all of the area within the corner members 34–40 is occupied in this configuration.

Figure 6:
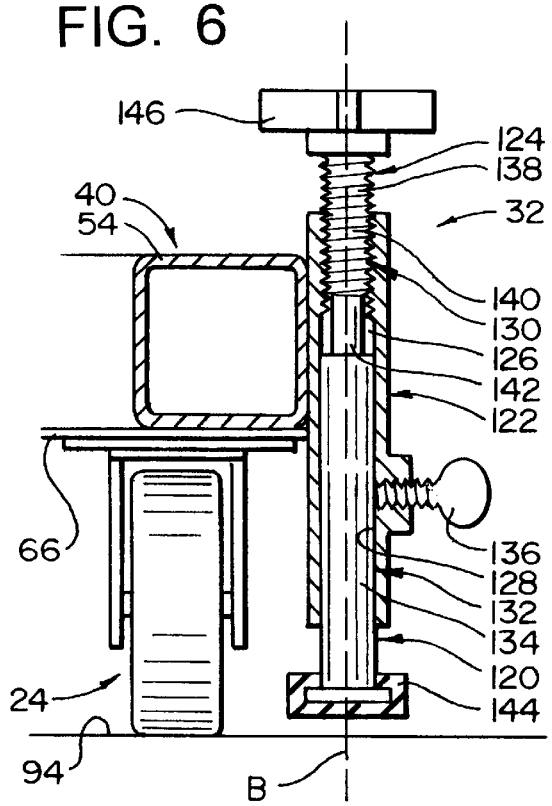
FIGS. 6–8 are section views taken along lines 6—6 in FIG. 2 that show the operation of one of the assemblies forming the lock system used by the mobile machine base of FIG. 1.
Figure 7:
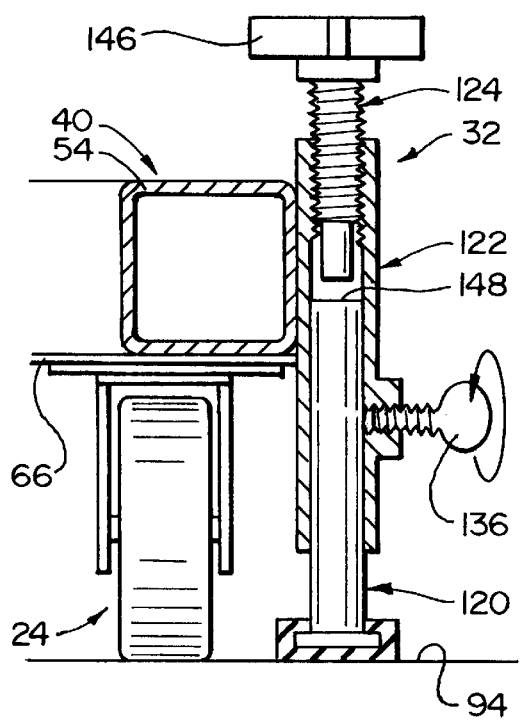
Figure 8:
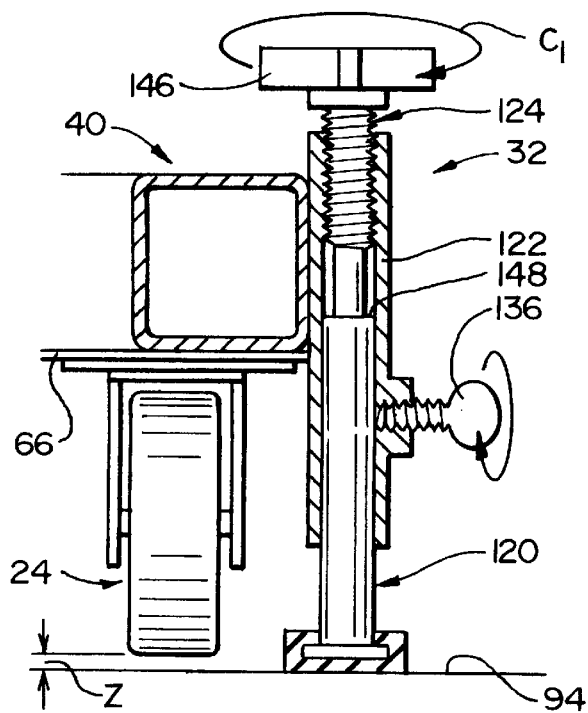

Referring now to FIGS. 6–8, the locking system 28 of the present invention will be described in further detail. As mentioned above, the locking system 28 comprises locking assemblies 30 and 32. Each of these assemblies 30 and 32 are identical, and only the assembly 32 will be described herein in detail.

As shown in FIGS. 6–8, the lock assembly 32 comprises a lock member 120, a lock housing 122, and a drive member 124.

The lock housing 122 defines a lock chamber 126 defined by an inner surface 128 of the housing 122. The chamber 126 comprises a threaded portion 130 and a cylindrical portion 132.

The lock member 120 has a cylindrical shaft 134 that is snugly received within the cylindrical portion 132 of the lock cavity 126. The longitudinal axes of the shaft 134 and cylindrical portion 132 are aligned as shown at B in FIG. 6.

The tolerances between the shaft 134 and cylindrical portion 132 are such that the stop member 120 may move relative to the lock housing 122.

A set screw 136 is threaded into the lock housing 122. The set screw 136 selectively allows the user to prevent or allow relative movement between the lock member 120 and the lock housing 122.

The drive member 124 has a shaft 138 with a threaded portion 140 and a cylindrical portion 142. The threaded portion 140 of the drive member shaft 138 is threadably received by the threaded portion 130 of the lock chamber 126. Rotation of the drive shaft 138 about the axis B allows the shaft to be displaced upward or downward along the axis B.

A resilient member 144 may be placed on the stop member 122 to prevent damage to the floor surface 94. A handle 146 may be placed on the drive member 124 to facilitate rotation of the shaft 130 about the axis B.

The purpose and use of the lock system 28 is best understood in the context of the entire machine base assembly 20. Accordingly, the operation of the lock system 28 will be described further below after an explanation of the use of the overall machine base assembly 20.

Referring for a moment now to FIG. 3, it can be seen that the front and rear wheels 24 and 26 are different. The rear wheels are fixed such that they rotate only about a horizontal axis, while the front wheels 24 are swivel wheels that can rotate about both a horizontal axis and a vertical axis. Both types of wheel assemblies are widely available in the marketplace and will not be discussed herein in detail. This wheel configuration allows the base 20 to be steered as it rolls.

With the foregoing understanding of the construction of the present invention, the use of the present invention will now be described in detail.

Initially, the effective footprint of the machine 21 is determined. This is specifically accomplished by the measuring the width $W_1$ and depth $D_1$ of the particular machine 21 to be supported. Once the width $W_1$ and depth $D_1$ are known, the side members 42–48 are inserted into the corner members 34–40 such that the width $W_2$ and depth $D_2$ of the assembly 20 is slightly larger than the corresponding dimensions of the effective footprint. These dimensions $W_2$ and $D_2$ cannot be made too large, however, as enough of the corner portions 68–76 of the machine 21 must overlap the supports surfaces 68 to provide a stable platform for the machine 21.

The bolts 50 are then inserted through the holes 92 in the bars 52 and 54 and threaded into the holes 82 in the side members 42. This forms the rigid frame assembly 22 described above.

At this point, the machine 21 is placed onto the machine base assembly 20 such that the corner portions 68–76 thereof are supported on the support surfaces 68 of the rectangular plate 66.

At this point, the machine 21 may be rolled on the wheels 24 and 26 to a desired location. At the desired location, the locking system 28 is used to prevent unwanted movement of the machine 21.

In particular, the set screw 136 is backed off so that it does not engage the stop member 120. The stop member 120 is thus free to fall until it contacts the floor surface 94 as shown in FIG. 7. The handle 146 is then grasped and rotated as shown by arrow $C_1$ in FIG. 8 such that the cylindrical portion 142 of the drive member 24 engages an upper end 148 of the stop member 120. Continued rotation of the handle 146 in the direction $C_1$ will cause the wheel 24 to lift off the ground a short distance Z as shown in FIG. 8. At this point, the stop member 120 frictionally engages the floor surface 94 to prevent relative movement between the machine 21 and the floor 94. The lock system thus securely locates the machine 21 at its desired location. Additionally, a certain amount of leveling can be obtained by altering the distances Z as necessary.

The set screw 136 can be used to further secure the lock member 120 relative to the lock housing 122 and maintain the distance Z as desired.

If the machine 20 is to be moved, the set screw 136 is disengaged from the stop member 120. The handle 146 is then turned in the direction opposite the arrow $C_1$ until the wheel 24 again touches the ground. The handle 146 will be then moved further to a position as shown in FIG. 7 relative to the stop member 120. At this point, the stop member 120 can be lifted by hand into the position shown in FIG. 6, at which point the set screw 136 is rotated to engage the stop member 120 and prevent it from dropping back down into contact with the floor surface 94.

The locking system 28 thus provides a secure lock but can easily be engaged and disengaged as necessary to fix or change the location of the machine 21.

Implicit in the discussion above is the fact that the machine base assembly 20 may be broken down into basically eight separate pieces for shipping and transportation. In particular, the screws 50 are simply removed and the side members 42–48 are removed from the corner members 34–40. The broken-down mobile machine base assembly 20 may thus be stored in a much smaller configuration whenever desired.

Referring now to FIGS. 9–10, depicted therein is a mobile machine base 220 constructed in accordance with, and embodying, the principles of a second embodiment of the present invention. The mobile machine base 220 is constructed and operates in basically the same manner as the mobile machine base 20 described above. The mobile machine base 220 will thus be described herein only to the extent that it differs from the machine base 20 described above.

In particular, the machine base 220 comprises a frame assembly 222, front and rear wheel assemblies 224 and 226, and a locking system 228 comprising first and second locking assemblies 230 and 232. And as shown in more detail in FIG. 10, the frame assembly 222 comprises first, second, third, and fourth corner members 234, 236, 238, and 240 and first, second, third, and fourth side members 242, 244, 246, and 248. The frame assembly 222 further comprises a plurality of screw members that join the corner members 234–240 to the side members 242–248.

The frame assembly 222 is similar to the frame assembly 22 described above, the primary difference being the cross sections of the corner members 234–240 and the side members 242–248.

In particular, as shown in FIG. 11, the corner members and side members are provided with a generally rectangular cross-sectional area in contrast to the generally square rectangular area of the corner members and side members of the frame assembly 22 described above with reference to FIG. 5. FIG. 11 depicts the corner member 238 and side member 244; the other corner members and side members have similar cross-sectional areas.

In use, the corner members and side members are joined together and assembled such that the longer surface of the rectangular cross-sectional area is generally vertically arranged.

FIG. 10 further shows that the front wheel assemblies 224 and rear wheel assemblies 226 are not mounted directly below the corner members as was the case in the exemplary mobile machine base 20 described above. To the contrary, as shown in FIG. 9, the wheel assemblies 224 and 226 are mounted on angle irons 252 and 254 that extend from front sides 256 and 258 of the frontmost corner members 238 and 240 and from the back sides 260 and 262 of the backmost corner members 234 and 236. The connections between these wheel assemblies 224 and 226 and the front and back sides 256–262 are the same, and only the connection between the rear wheel assembly 226b and corner member 234 will be described in detail.

Referring initially to FIG. 9, it can be seen that the angle iron 254 has a generally L-shaped cross section comprising an upper portion 264 and a lower portion 266. The lower portion 266 is welded to the back side 262 of the corner member 234 such that the lower portion 266 is generally vertically aligned and the upper portion 264 is generally horizontally aligned. These portions 264 and 266 extend at right angles from each other.

Referring now to FIG. 10, it can be seen that the angle iron 254b extends a short distance, approximately two to four inches, from a side surface 268 of the corner member 234 towards the adjacent corner member 236. This upper portion 264 is sized and dimensioned to form a suitable mounting surface for the wheel assembly 226b. Again, the wheel assembly 226 is or may be conventional.

The angle irons perform two basic functions. First, they allow the frame assembly 222 to be slightly lower during use than the frame assembly 22 described above. This is because the surfaces on which the wheel assemblies 224 and 226 are attached are at or near the top of the corner members 234–240 rather than at the bottom of these members. In addition, they create a slightly larger footprint for the overall machine base 220.

The benefits of the placement of the wheels 224 and 226 is that the level of the work surface of the machine 21 mounted thereon will not be significantly higher than the surface of the machine 21 when the base 220 is not in use. In addition, the slightly longer wheel base will slightly increase the stability of the system.

In all other respects, the mobile machine base 220 is constructed, operated, and used in the same manner as the mobile machine base 20 described above.

From the foregoing, it should be clear that the invention may be embodied in other specific forms without departing from the spirit or essential characteristics thereof. The present embodiments are therefore to be considered in all respects as illustrative and not restrictive.

I claim:

1. A mobile base for allowing machinery having an effective footprint within a predetermined range of effective footprints to be moved along a floor surface, comprising:

a frame assembly having a width dimension and a depth dimension;

first and second wheels attached to the frame assembly such that the first and second wheels rotate about a substantially horizontal fixed axis;

third and fourth wheels attached to the frame assembly such that
        the third wheel rotates about a substantially vertical first steering axis and about a substantially horizontal first movable axis, and
        the fourth wheel rotates about a substantially vertical second steering axis and a substantially horizontal second movable axis; and a locking system comprising
- a lock housing defining a lock chamber,
- a lock member slideably mounted within the lock chamber of the lock housing such that the lock member moves between an unlocked position in which the lock member does not engage the floor surface and a locked position in which the lock member frictionally engages the floor surface, and
- a drive member that engages the lock housing such that rotation of the drive member causes the drive member to move towards or away from the floor surface, where the drive member is at least partly located within the lock chamber above the lock member and is capable of rotating with respect to the lock member; wherein
- the frame assembly comprises means for allowing the width and depth dimensions to be adjusted among a plurality of discrete dimensions such that the mobile base can accommodate effective footprints within the predetermined range of effective footprints.

2. A mobile base as recited in claim 1, in which the locking system further comprises a set screw member that engages the lock housing and selectively engages the lock member to allow or prevent relative movement between the lock housing and the lock member.

3. A mobile base as recited in claim 1, in which the lock housing comprises:
- a threaded portion adapted to mate with a threaded portion of the drive member; and
- a cylindrical portion sized and dimensioned to receive at least a portion of the lock member; wherein
  - when the drive member is axially rotated about its longitudinal axis, the threaded portion of the housing engages the threaded portion of the drive member to displace the drive member relative to the housing.

4. A mobile base for allowing machinery to be moved along and securely supported on a floor surface, comprising:
- a frame assembly for supporting the machinery;
- first and second wheels attached to the frame assembly such that the first and second wheels rotate about a substantially horizontal fixed axis;
- third and fourth wheels attached to the frame assembly such that
  - the third wheel rotates about a substantially vertical first steering axis and about a substantially horizontal first movable axis, and
  - the fourth wheel rotates about a substantially vertical second steering axis and a substantially horizontal second movable axis; and
- a locking system comprising
  - first and second lock housings defining first and second lock chambers, respectively,
  - first and second lock members movably mounted within the first and second lock chambers, where the lock members move between an unlocked position in which the lock members do not engage the floor surface and a locked position in which the lock members frictionally engage the floor surface, and
  - first and second drive members that engage the first and second lock housings such that rotation of the drive members causes the drive members to move towards or away from the floor surface, where the drive members are at least partly located within the lock chambers above the first and second lock members and capable of rotating with respect to the lock members.

5. A mobile base as recited in claim 4, in which the locking system further comprises set screw members that engage respective lock housings and selectively engage respective lock members to allow or prevent relative movement between the lock housings and the lock members.

6. A mobile base as recited in claim 4, in which each lock housing comprises:
- a threaded portion adapted to mate with a threaded portion of the respective drive member; and
- a cylindrical portion sized and dimensioned to receive at least a portion of the respective lock member; wherein
  - when the respective drive member is axially rotated about its longitudinal axis, the threaded portion of the housing engages the threaded portion of the respective drive member to displace the respective drive member relative to the housing.

* * * * *